March 10, 1959
O. LINDHEIM
2,876,808
PORTABLE, ELECTRICALLY POWERED, HAND-OPERATED SAW-GUIDE
Filed Dec. 27, 1956
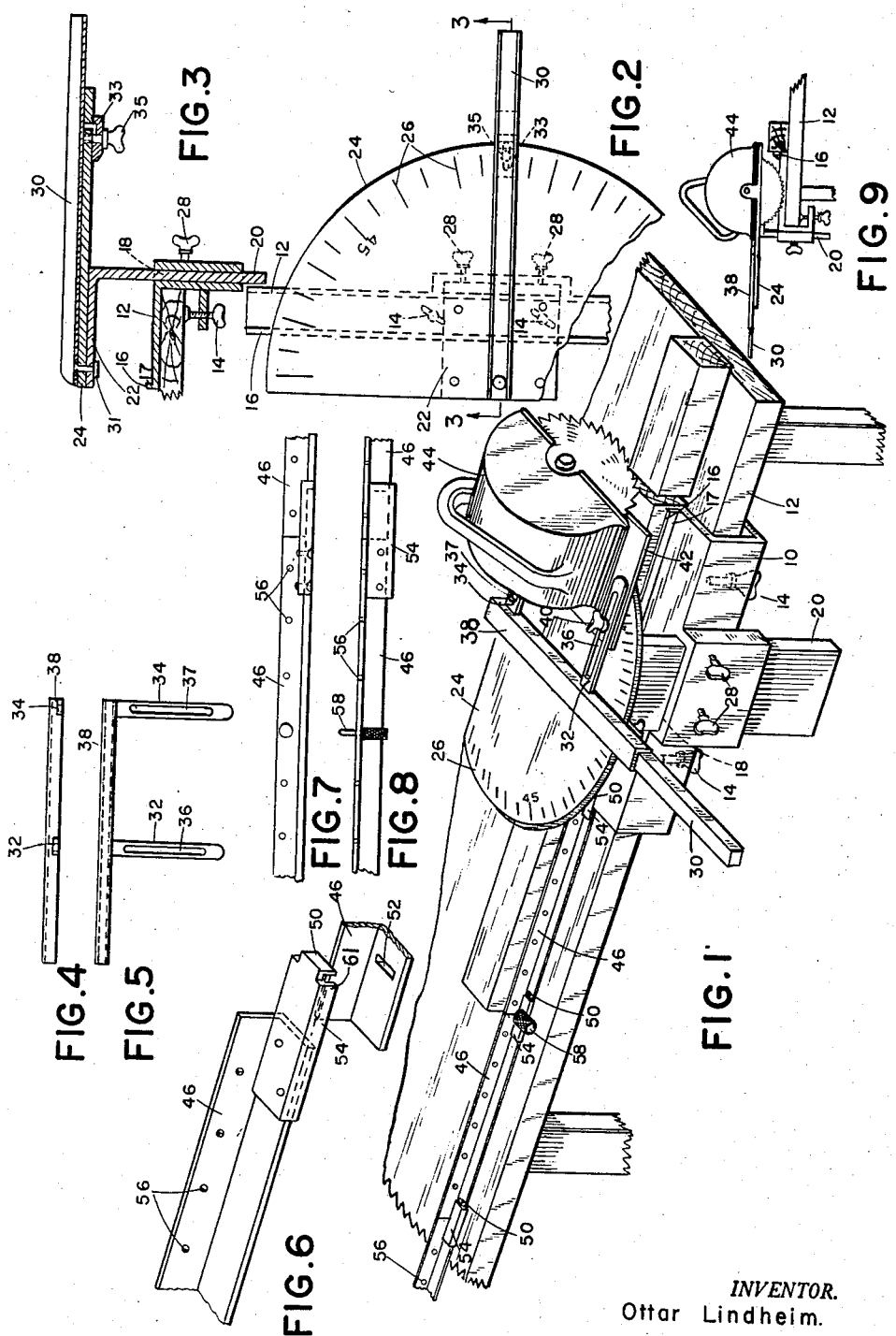
INVENTOR.
Ottar Lindheim.
BY
ATTORNEY.

United States Patent Office 2,876,808
Patented Mar. 10, 1959

2,876,808

PORTABLE, ELECTRICALLY POWERED, HAND-OPERATED SAW-GUIDE

Ottar Lindheim, Brooklyn, N. Y.

Application December 27, 1956, Serial No. 630,809

1 Claim. (Cl. 143—6)

This invention relates to new and useful improvements in the cutting of lumber and other materials with a portable, electrically powered, hand-operated saw, which due to the construction of the device is guided in a desired straight line.

Thus one object of this invention is to provide a saw guide for a portable electric hand saw, which is very efficient and accurate in operation, as it prevents any undesirable movement in lateral directions during the longitudinally travel of the saw along said guide.

A further object of the invention is to provide a guiding platform, adjustable to any desired heights, so as to suit the thickness of the material to be cut.

Another object of the invention is to provide a portable electric saw guide which may easily be carried from place to place so as to economize the cutting of lumber.

A still further object of the invention is to provide a portable electric saw guide having a sectional channel with stops so as to be able to cut equal lengths of lumber in quantities.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is a perspective view showing a conventional hand saw mounted by means of a clamp and an adjustable saw platform with saw guide and spacer channels, in working position.

Figure 2 is a plan top view of the saw guide platform and clamp.

Figure 3 is a sectional elevated view of the clamp and saw guide platform with guide channels.

Figure 4 is a side elevational view of said guide platform.

Figure 5 is a top plan view of Figure 4.

Figure 6 is a perspective view of the spacer channels and locking device.

Figure 7 is a side elevational view of the spacer channels; while

Figure 8 is a top plan view of said spacer channels.

Figure 9 is a schematic side view with saw drawn back.

Referring more particularly to the drawing, Figure 1 shows a clamp 10, which is fastened to a workbench 12 by means of thumbscrews 14 holding the saw guide securely in position.

The clamp 10 is provided with a vertically extending channel 18 at its front, a slide member 20 is mounted in said channel for vertical adjustment, an angularly bent plate 22 is arranged upon said slide member 20, and a horizontal semi-circular platform 24 made with graduations thereon is secured to said plate.

A guide bar 38 is pivoted to and about the center of said semi-circular platform and securable at a selected angle upon said platform, a free-riding inverted channeled sliding member 30 is disposed over said guide bar 38, laterally extending arms 32, 34 are arranged on said channeled member 38, said arms are formed with slots 36 and 37 adapted to receive thumbscrews 40 to secure said arms to the plate 42 of the power saw 44.

The slide member 20 is locked in place by thumbscrews 28 in such a position as to obtain the desirable thickness of the lumber to be cut.

I claim:

In a portable, electrically powered, hand-operated saw, the combination of a workbench, a clamp, thumbscrews securing the latter to said workbench, said clamp being provided with a vertically extending channel, a slide member mounted in the latter for vertical adjustment, an angularly bent plate arranged upon said slide member, and a horizontal semi-circular platform made with graduations thereon and being secured to said plate, a guide bar pivoted to and about the center of said semi-circular platform and securable at a selected angle upon said platform, a free-riding inverted channeled sliding member disposed over said guide bar, laterally extending arms arranged on said channeled, member, said arms being formed with slots adapted to receive thumbscrews securing said arms to the bottom plate of the portable powered saw.

References Cited in the file of this patent

UNITED STATES PATENTS

| | | |
|---|---|---|
| 198,963 | Bonney | Jan. 8, 1878 |
| 663,645 | Strait | Dec. 11, 1900 |
| 1,911,045 | Tinnen | May 23, 1933 |
| 2,214,388 | Summers | Sept. 10, 1940 |
| 2,627,287 | McCluskey | Feb. 3, 1953 |
| 2,735,455 | Forsberg | Feb. 21, 1956 |